March 8, 1927.
P. SOKOLOWSKI
1,620,138
VEGETABLE AND FRUIT SLICER
Filed Oct. 26, 1925
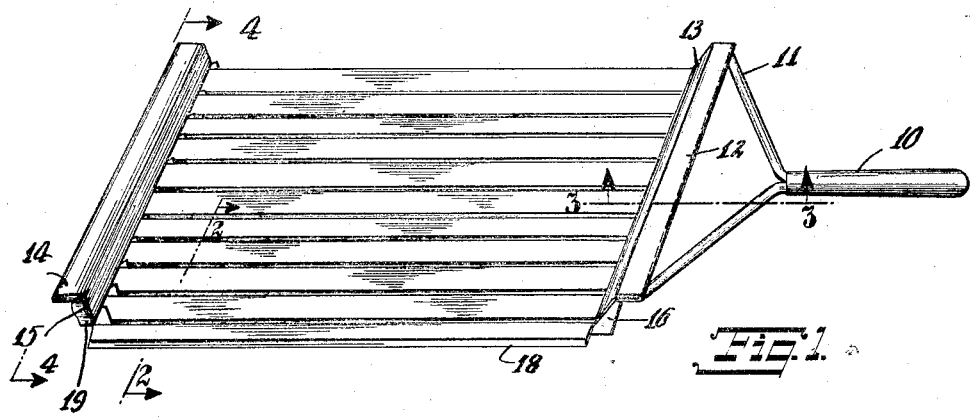
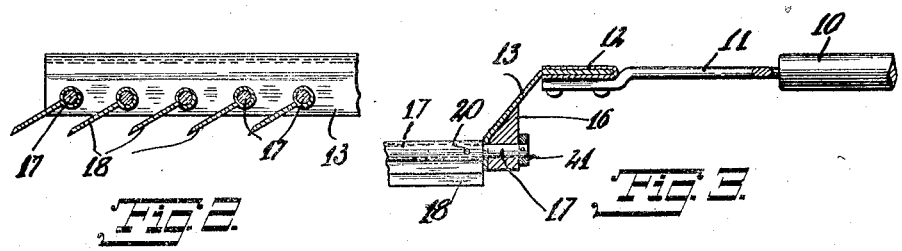
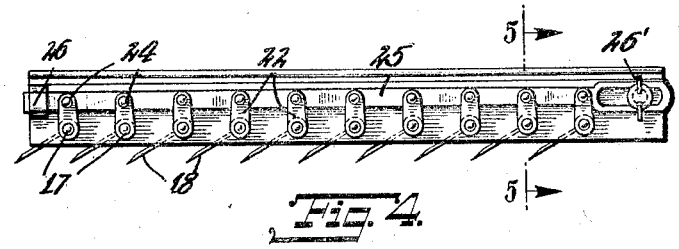
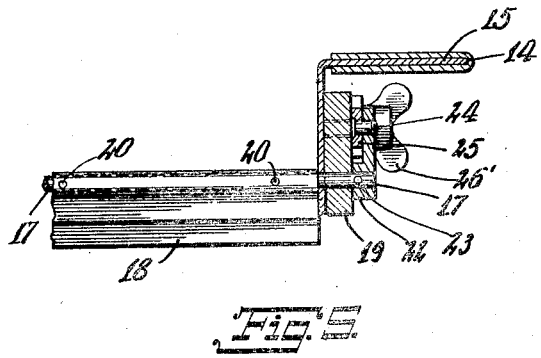
*INVENTOR.*
Peter Sokolowski
BY
*ATTORNEY*

Patented Mar. 8, 1927.

1,620,138

UNITED STATES PATENT OFFICE.

PETER SOKOLOWSKI, OF GIRARDVILLE, PENNSYLVANIA, ASSIGNOR OF ONE-HALF TO MAT STRACK, OF GIRARDVILLE, PENNSYLVANIA.

VEGETABLE AND FRUIT SLICER.

Application filed October 26, 1925. Serial No. 64,793.

This invention relates to an apparatus for slicing vegetables or fruits, especially well adapted for the slicing of cabbages, and it consists essentially of a multiple of adjustable cutting edges; arrangement and construction of parts as hereinafter set forth and particularly pointed out in the claims.

In the accompanying drawings in which an embodiment of the invention is illustrated—

Fig. 1 is a perspective view looking at the device from the top.

Fig. 2 is a fragmentary transverse vertical sectional view on the line 2—2 of Figure 1.

Fig. 3 is a fragmentary transverse vertical sectional view on the line 3—3 of Figure 1.

Fig. 4 is a vertical side elevation as indicated by line 4—4 of Figure 1.

Fig. 5 is a fragmentary transverse sectional view on the line 5—5 of Figure 4.

The handle 10 has a supporting member 11 rigidly connected to body strip 12 and holder strip 13. Similarly on the other end of the device, a body strip 14 has a holder strip 15 rigidly attached.

Holder strip 13 has attached a bearing strip 16 provided with a plurality of bearing holes, one for each of shafts 17 and therefore for cutters 18. Similarly the other end of device is also provided with a bearing strip 19 which is provided with a plurality of bearing holes, one for each of shafts 17 and therefore for cutters 18. The cutters 18 are fixed to the shafts 17 with pins 20 and said shafts are movably mounted in bearing holes of bearing strips 16 and 19.

One of the ends of shafts 17 have holding collars 21 attached allowing shafts to rotate but preventing the disengaging of shafts from the bearing holes.

The other of the ends of the shafts 17 have each connecting links 22 rigidly attached by pins 23, and said connecting links are movably attached with rivets 24 to a control member 25, said control member having a bearing support 26 at one end, a locking device at the other end consisting of a winged lock nut 26' acting against an elongated aperture in said control member. The action of aforedescribed mechanism is such that control member 25 may be locked in any desired position by means of winged lock nut 26'. Since the cutters 18 are rigidly attached to shafts and shafts to links, a change in position of the control member will cause a change in angle of the cutters, which effects the perpendicular distance between said cutters, and therefore the thickness of the sliced material. After adjusting mechanism to the desired slice-thickness, hold device by the handle with one hand and by the body strip 14, with the other hand and force the cutters through the vegetable to be sliced. With one stroke an entire vegetable or fruit, whether a cabbage, or a banana may be sliced.

As shown in Fig. 3, the end portions of the shafts 17 are disposed in openings in the end member 16 and as shown in Fig. 5 the other end portions of the shafts are disposed in openings in the end members 19. Each of the extremities of the shafts is provided with collars 21 and 22 respectively, which are secured to the shafts and prevent displacement of the same from the end members. The shafts 17 are preferably of substantially non-flexible material, and are of sufficient diameter, and strength to restrain parallel movement of the end members relative to each other. It should be understood that with the end members engaged on the outer side thereof by the collars 21 and 22 and with the inner sides of the end members engaged by the ends of the blades and the cylindrical portions thereof which surround the shafts 17, the end members 16 and 19 are firmly clamped in place. The diameter of the openings in the end members through which the shafts 17 pass are of a size adapted to provide a closely fitting relationship and thus bending of the shafts 17 adjacent the inner side of the end members 16 and 19 would be required to permit relative parallel movement of the same. The rigidity of the shafts resists such bending and consequently prevents appreciable relative parallel movement of the end members.

Having thus fully described my invention, what I claim as new, and desire to protect by Letters Patent of the United States is as follows:—

1. In an apparatus of the class described, spaced apart end members having openings therein, a plurality of shafts journalled near their extremities in said end members, said end members being held in spaced relation by said shafts, blade cutters rigidly attached to said shafts, connecting links rigidly fixed to said shafts, and control mechanism comprising a lever for simultaneously adjusting said blades, the free ends of said connecting links being operatively connected with said control lever.

2. In a device of the class described, a frame comprising spaced end members and open lateral sides, a plurality of shafts rotatively mounted near their extremities in said end members, blades rigidly attached to said shafts said shafts and blades being adapted to retain said end members in a fixed spaced relation, connecting links rigidly fixed to said shafts, on the outside of one of said end members, a control lever slidably mounted on said end member, the free ends of said connecting links being operatively connected with said control lever for rendering said blades simultaneously adjustable.

3. In a device of the class described, a frame comprising spaced end members and open lateral sides, a plurality of shafts rotatively mounted near their extremities in said end members, and blades mounted on said shafts, said shafts and said blades being adapted to retain said end members in spaced relation, said frame being adapted to be positioned with its end members substantially disposed parallel to material being sliced to position said blades laterally of said material.

In testimony whereof I have affixed my signature.

PETER SOKOLOWSKI.